(12) United States Patent
Hayashi et al.

(10) Patent No.: US 6,216,070 B1
(45) Date of Patent: Apr. 10, 2001

(54) PASSENGER PROTECTING APPARATUS

(75) Inventors: Haruyoshi Hayashi; Yasuo Saito; Kunihiro Kaneko, all of Saitama (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/161,467

(22) Filed: Sep. 28, 1998

(30) Foreign Application Priority Data

Sep. 29, 1997 (JP) .................................................. 9-264187
Nov. 5, 1997 (JP) .................................................. 9-303194

(51) Int. Cl.$^7$ ............................ B60R 21/00; B60R 22/00
(52) U.S. Cl. .......................... 701/45; 180/282; 280/728.1
(58) Field of Search ........................... 701/45; 280/728.1, 280/734, 735; 180/282

(56) References Cited

U.S. PATENT DOCUMENTS

| | | | |
|---|---|---|---|
| 4,836,024 | * 6/1989 | Woehrl et al. | 307/10.1 |
| 4,974,874 | * 12/1990 | Muraoka | 280/735 |
| 5,083,276 | * 1/1992 | Okano et al. | 701/46 |
| 5,208,484 | * 5/1993 | Okano et al. | 307/10.1 |
| 5,389,822 | * 2/1995 | Hora et al. | 307/10.1 |
| 5,409,258 | * 4/1995 | Kawabata | 280/735 |
| 5,418,722 | * 5/1995 | Cashler | 701/45 |
| 5,483,447 | * 1/1996 | Jeenicke et al. | 701/45 |
| 5,779,264 | * 7/1998 | de Mersseman et al. | 280/735 |
| 5,826,902 | * 10/1998 | Foo et al. | 280/735 |

* cited by examiner

Primary Examiner—Michael J. Zanelli
Assistant Examiner—Eric M. Gibson
(74) Attorney, Agent, or Firm—Rothwell, Figg, Ernst & Manbeck

(57) ABSTRACT

A passenger protecting apparatus for inflating an air bag or tightening a seat belt is provided that is smaller in size and more reliable than any previously known passenger protecting apparatus. The passenger protecting apparatus has two switches connected in series with a squib. The switches are controlled by a control unit using independent program routines in a redundant manner. The control unit combines front collision and side collision detection in one unit. The control unit controls the switches based on the outputs of several acceleration sensors, by comparing their respective outputs to threshold values.

24 Claims, 9 Drawing Sheets

PASSENGER PROTECTING APPARATUS

BACKGROUND OF THE INVENTION

1. Field of the Invention

The present invention relates to a passenger protecting apparatus, which inflates an air bag for protecting the passenger in an instant, when a vehicle has an accident such as a collision. More specifically, the present invention relates to a controlling unit of a squib for inflating an air bag. A "squib" is herein defined as a detonator for inflating an air bag and/or for tightening the seat belt, in this specification and Claims.

2. Description of the Prior Art

Figure 8:
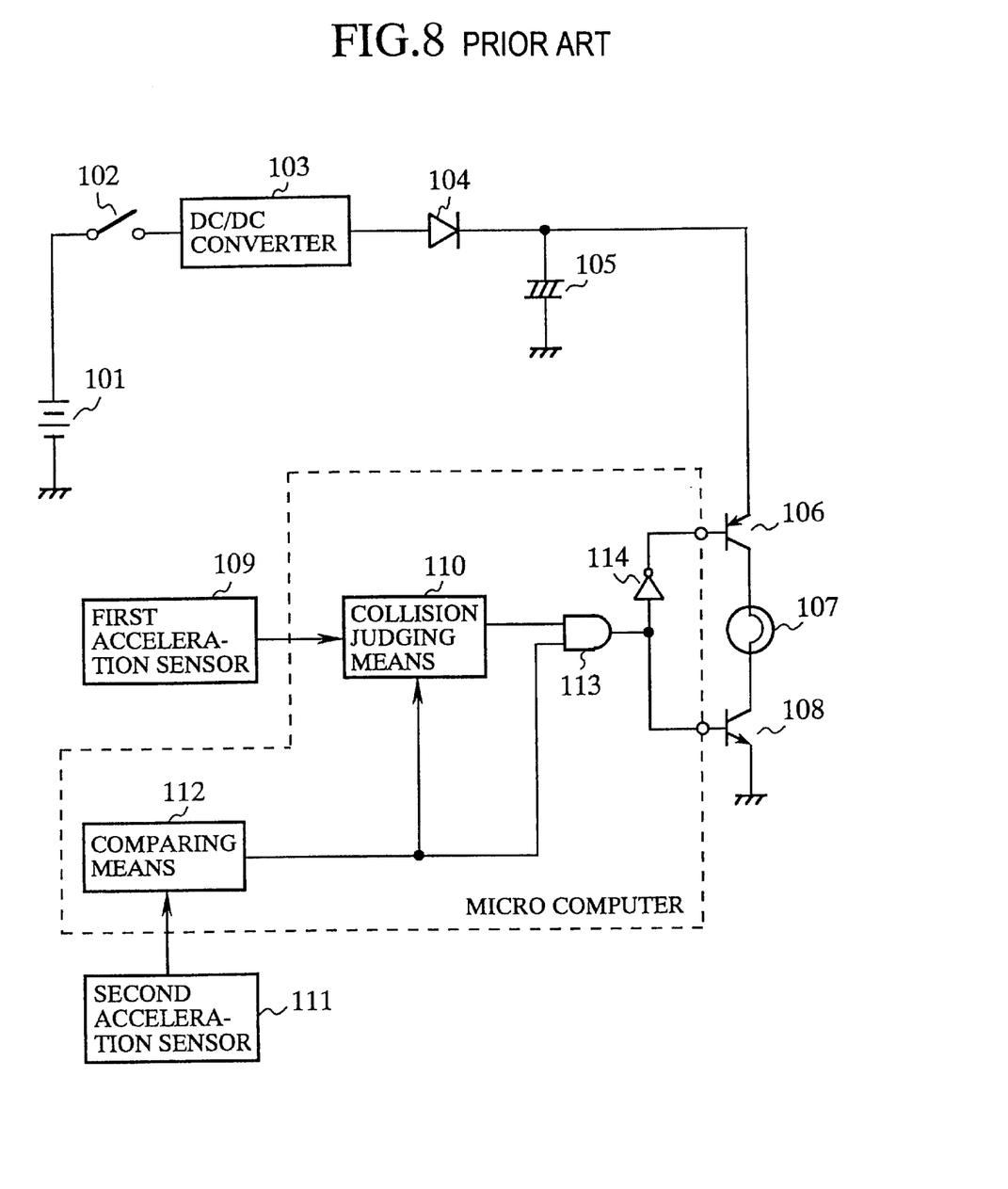
FIG. 8 shows a block diagram of a passenger protection apparatus in the prior art.

FIG. 8 shows a block diagram of a controlling unit of a squib, in the prior art, of a squib in such a passenger protecting apparatus.

An ignition switch 102, a DC/DC converter 103, a diode 104 for counter-current prevention, a first switching transistor 106 (first switching circuit), a squib 107, a second transistor 108 (second switching circuit) are connected in series between both of the terminals of a battery 101. The line connecting the diode 104 and the first switching transistor 106 is connected through a back up capacitor 105 with large capacity to the ground line.

In a collision, first and second acceleration sensors 109, 111 generate acceleration signals. The acceleration signal from the first acceleration sensor 109 is provided to a collision judging means 110, and the acceleration signal from the second acceleration sensor 111 is provided to a comparing means 112. When the acceleration signal from the second acceleration sensor 111 exceeds a standard value, a high level signal is provided to an input terminal of an AND gate means 113 and to the collision judging means 110 as a switch signal.

The procedure of the collision judging algorithm in the collision judging means 110 begins at the moment, when a trigger signal, which corresponds to the standing up edge of the high level signal, is given. It estimates the accident whether the accident is so grave that it leads to an injury of the passenger(s). When it estimates that the accident can lead to a grave injury of the passenger(s), the collision judging means 110 supplies a high level signal to the other input terminal of the AND gate means 113.

The base terminal of the first switching transistor 106 is connected with the output terminal of the AND gate means 113 through an inverter 114, and the base terminal of the second switching transistor 108 is connected with the output terminal of the AND gate means 113 directly.

When the accident is estimated to be grave, the AND gate means receives high level signals from the collision judging means 110 and comparing means 112 simultaneously. As a result, the first and second switching transistors 106,108 turn on. The back up capacitor supplies the electric energy stored therein to the squib 107, then the squib actuates the air bag to inflate.

In the aforementioned passenger protecting apparatus, only one AND gate means 113 is used, and both switching transistors 106,108 are driven, depending on the output of the AND gate means.

There is a problem in constructing the controlling unit by a micro computer containing a CPU, and a soft ware program equivalent to the collision judging unit 110, the AND gate 113, the inverter and the comparing means 112.

When the output of the AND gate means becomes to a high level, due to malfunction in the soft ware program or due to a false signal caused by external noise, the first and second switching transistors connected to the both sides of the squib turn on simultaneously. This can lead to an erroneous operation of the squib.

Figure 9:
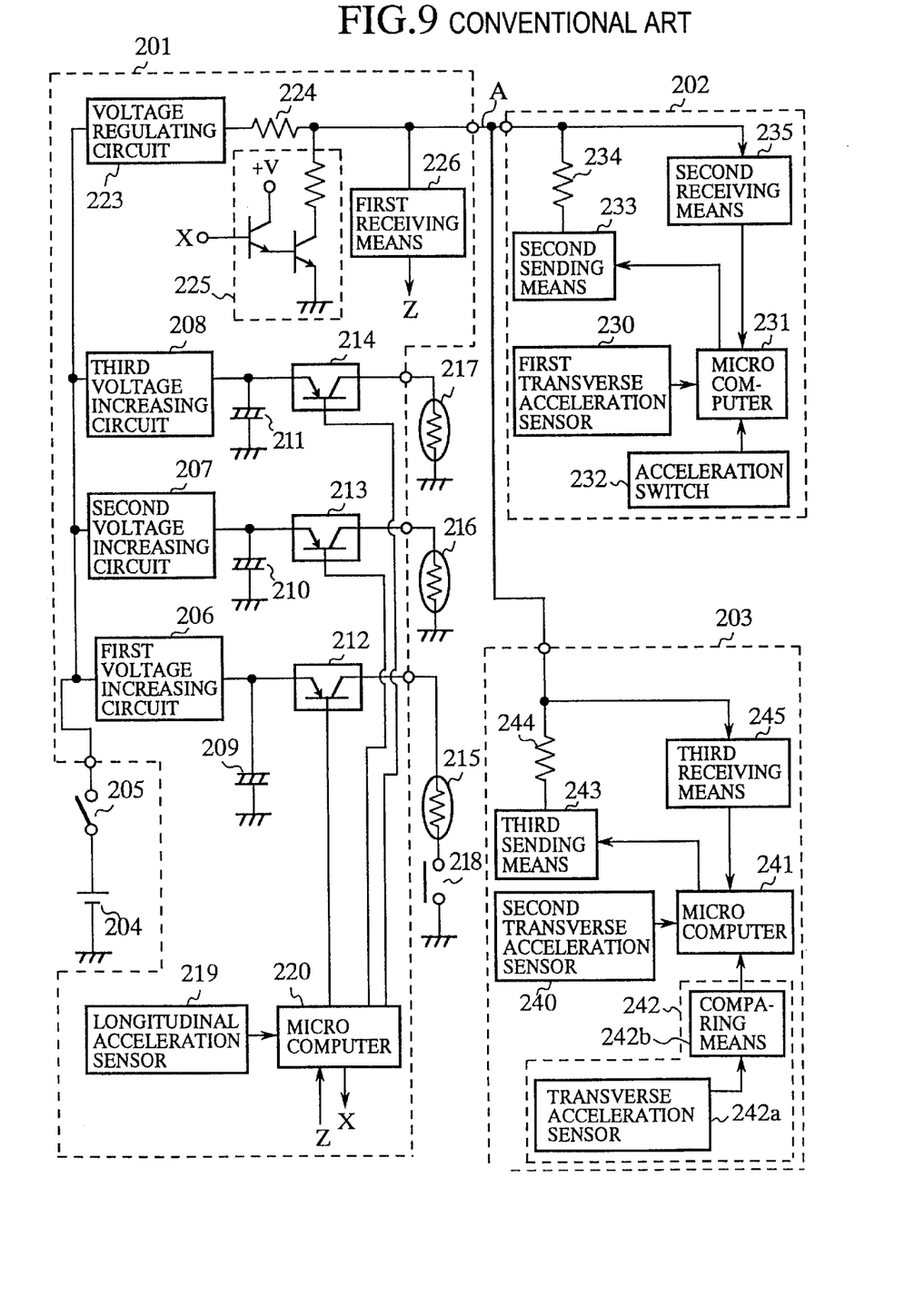
FIG. 9 shows a block diagram of a passenger protection apparatus in another prior art.

FIG. 9 is a block diagram of another example of a controlling unit of a squib in a passenger protecting apparatus that is disclosed in a Japanese Patent Application, which has not yet been published.

The controlling unit comprises a controlling unit for a front air bag 201 (it is called also as a pre-tensioned unit), a controlling unit for a side air bag at the conductor's seat 202 and a controlling unit for a side air bag at the seat next to the driver 203, which communicate to each other using a multi-superposition communication system, using the power supply wire as a signal line.

At first, the controller unit for the front air bag is explained.

First, second and third voltage increasing circuits 206, 207, 208 convert the input voltage, which is supplied from a battery 204 through an ignition switch 205, to a higher voltage and charge a first, second and third back up capacitor 209, 210, 211, which are respectively connected.

The input terminals of a first, second and third switching circuit 212, 213, 214 are connected respectively with the output terminal of the corresponding first, second and third voltage increasing circuits 206, 207, 208, and their output terminals are connected respectively with a corresponding squib 215, 216, 217.

When the ignition switch 205 is put on, the first, second and third back up capacitor 209, 210, 211 are charged from the battery 204 through the first, second and third voltage increasing circuits 206, 207, 208, and a micro computer 220 in the controlling unit for front air bag 201 starts its procedure. Simultaneously, the voltage regulating circuit 223 begins to supply electric power to the controlling units for the side air bag at the driver's seat 202 and the controlling unit for side air bag at the seat next to the driver' seat 203.

When an igniting signal is provided to the input terminal of one of the first, second and third switching circuits 212, 213, 214 from the micro computer 220, an ignition current from the corresponding back up capacitor 209, 210, 211 flows through the corresponding first, second and third squibs 215, 216, 217.

Reference numeral 218 denotes a mechanical acceleration sensor, which is connected with the first squib 215 in series and turns on when an acceleration over a predetermined value is detected. On the other hand, the longitudinal direction acceleration sensor 219 is an electric acceleration sensor, which detects the longitudinal acceleration at an collision of vehicle.

Reference numeral 220 denotes a micro computer, having a collision judging function. It estimates the accident as to whether it is grave or not, on the basis of the acceleration signal from the longitudinal acceleration sensor 219. When it estimates that the accident is grave, it turns on the first switching circuit 212. Hence, the charge stored in the first back up capacitor 209 flows as an ignition current through the first squib 215 and the mechanical acceleration sensor 218, which are connected in series. As a result, the front air bag for a front collision of vehicle is inflated, or the pre-tensioned unit is actuated. In this manner, the air bag and so like is inflated protecting the passenger(s) at the front collision of vehicle.

The controlling unit for the side air bag at the driver's seat 202 comprises of a first transverse acceleration sensor 230, a micro computer 231, an acceleration switch 232, a second sending circuit 233, a resistor 234 and a second receiving circuit 235. On the other hand, The controlling unit for the side air bag at the seat next to the driver's seat 203 comprises a second transverse acceleration sensor 240, a micro computer 241, an acceleration switch 242, a third sending circuit 243, a resistor 244 and a third receiving circuit 245. The corresponding components in both of the units are identical.

The transverse acceleration sensors 230, 240 have an identical structure as the longitudinal acceleration sensor 219, however, they are configured so as to detect the acceleration in the direction differed 90 degrees from the detection direction of the longitudinal acceleration sensor 219, namely they detect the acceleration in the transverse direction of vehicle. They provide their outputs to the micro computer 231, 241, respectively.

The micro computer 231, 241 have a collision judging functions as the micro computer 220 has, and estimate the accident on the basis of the acceleration signals provided from the second or third transverse acceleration sensors 230, 240 and the switch signal provided from the acceleration switches 232, 242.

The voltage regulating circuit 223 supplies a regulated voltage through the resistor 224 to the controlling units for the side air bag at the driver's seat 202 and for the side back at the seat next to the driver's seat 203.

A signal demand signal from the micro computer 220 to the controlling units for the side air bag at the driver's seat 202 or to the controlling unit for the side back at the seat next to the driver's seat 203 is provide to the first sending circuit 225 via a signal line X. The first sending circuit 225 superimposes it on the power supply line A.

On the other hand, when the micro computer 231 in the controlling units for the side air bag at the driver's seat 202 estimates that the accident is grave, on the basis of the switch signal from the first acceleration switch 232 and the acceleration signal from the first transverse acceleration sensor 230, it sends a corresponding signal, as a responding signal to the signal demanding signal from the micro computer 220, through the second sending circuit 233, the resistor 234 and the power supply line A, which are connected in series.

In the same manner, when the micro computer 241 in the controlling units for the side air bag at the driver's seat 203 estimates that the accident is grave, on the basis of the switch signal from the second acceleration switch 242 and the acceleration signal from the second transverse acceleration sensor 240, it sends a corresponding signal, as a responding signal to the signal demanding signal from the micro computer 220, through the third sending circuit 243, the resistor 244 and the power supply line A, which are connected in series.

The first receiving circuit 226 receives the responding signal from the controlling unit for the side air bag at the driver's seat 202 or from the controlling unit for the side air bag at the seat next to the driver's seat 203 through the power supply line, which functions here as a communication line. And it sends the responding signal to the micro computer 220 through a communication line Z.

When the micro computer 220 receives a signal, indicating that the accident is grave, from the micro computer 231 or 241 through the communication line Z, it actuates the corresponding second or third switch circuit 213, 241 to turn on. Hence, the charge stored in the second or third back up capacitor 210, 211 flows through the second or third squid 216, 217. As a result, the side air bag at the driver's seat of at the seat next to the driver's seat is inflated. In this manner, the air bag is inflated for protecting the passenger from the side collision of vehicle.

The rigidity of an old type vehicle is strong in the longitudinal direction, and is relatively weak in the transverse direction of vehicle. Accordingly, the controlling unit for a front collision 201 is located at the intermediate portion of the driver's seat and the seat next to the driver's seat. And the controlling units for a side collision 202, 203 are located separately at a lower portion of the center pillars beside the driver's seat and the seat next to the driver's seat. This is in order to assure the protection of the passenger from both front and side collisions. Due to this structure, fabrication and installing costs are rather large.

Recently, however, vehicles have the improvement of having high rigidity against external forces in the transverse direction. Thus the necessity to arrange the controlling units separately has decreased.

SUMMARY OF THE INVENTION

An object of the present invention is to provide a passenger protection apparatus, in which the control of squib is realized by a micro computer and a soft ware computer program, which can avoid mis-functioning of the squib.

Another object of the present invention is to provide a passenger protection apparatus, in which the transverse acceleration sensors are incorporated into a control unit for a front collision so as to unify the control units, and to improve the S/N ratio of the acceleration signal.

The first object is attained by the passenger protection apparatus according to claim 1, more specifically, it is attained by a passenger protection apparatus comprising of:
  a first acceleration sensor;
  a second acceleration sensor, the polarity of the output of the second acceleration sensor being opposite to that of the first acceleration sensor;
  a comparing means, which compares the output of the second acceleration sensor with a predetermined standard value, and generates a switch signal, when the output exceeds the standard value;
  a collision judging means, which estimates whether the collision is grave or not, on the basis of the output of the first acceleration sensor;
  a first AND gate means, which receives the output of the comparing means calculated for the first AND gate means, and the output of the collision judging means calculated for the first AND gate means;
  a second AND gate means, which receives, independently from the first AND gate means, the output of the comparing means calculated for the second AND gate means, and the output of the collision judging means calculated for the second AND gate means;
  a squib;
  a first and second switching circuit, which are connected with the squib in series and are controlled so as to turn on, according to the outputs of the first and second AND gate means, respectively;
  wherein the comparing means, the collision judging means, and the first and second AND gate means are realized as a software computer program routine.

In an embodiment, the outputs of the collision judging means appear at different output ports of the micro computer, through the first and second AND gate means.

In an embodiment, the first and second acceleration sensors have same characteristics.

In an embodiment, one of the first and second acceleration sensors detects the acceleration in higher range, and the other detects the acceleration in lower range.

The second object is attained by the passenger protection apparatus according to claim 4, more specifically, it is attained by a passenger protection apparatus comprising of:

a squib for inflating an air bag;

a first and second acceleration sensors, the sensing direction of which is opposite to each other;

a comparing means, which compares the output of the second acceleration sensor with a predetermined standard value, and generates a switch signal, when the output exceeds the standard value;

a collision judging means, which estimates whether the collision is grave or not, on the basis of the output of the first acceleration sensor, and generates an ignition signal, according to the estimation;

means for controlling the squib, which generates a signal to blow out the air bag, on the basis of the ignition signal from the collision judging means and the switch signal from the comparing means;

wherein the collision judging means calculates the subtraction between the outputs of the first and second acceleration sensors, and estimates the collision, on the basis of the calculated subtraction.

In an embodiment, two sets of the first and second acceleration sensors are installed therein, one of them is orientated along the longitudinal direction, and the other is orientated along the transverse direction of the vehicle.

In an embodiment, the first and second acceleration sensors of each set, for detecting the acceleration along the longitudinal direction or along the transverse direction of the vehicle, have same characteristics.

In an embodiment, the collision judging means estimates whether the collision is a front collision or a side collision, on the basis of the polarities of the outputs of the first and second acceleration sensors.

In an embodiment, the collision judging means estimates whether the collision is grave or not, on the basis of thee outputs of the first and second acceleration sensors, and generates an ignition signal to actuate the squib, on the basis of the estimation.

In an embodiment, the first acceleration sensor detects a large acceleration, the second acceleration sensor detects a small acceleration with high sensitivity.

DETAILED DESCRIPTION OF THE PREFERRED EMBODIMENTS

First Aspect of the Invention

Figure 1:
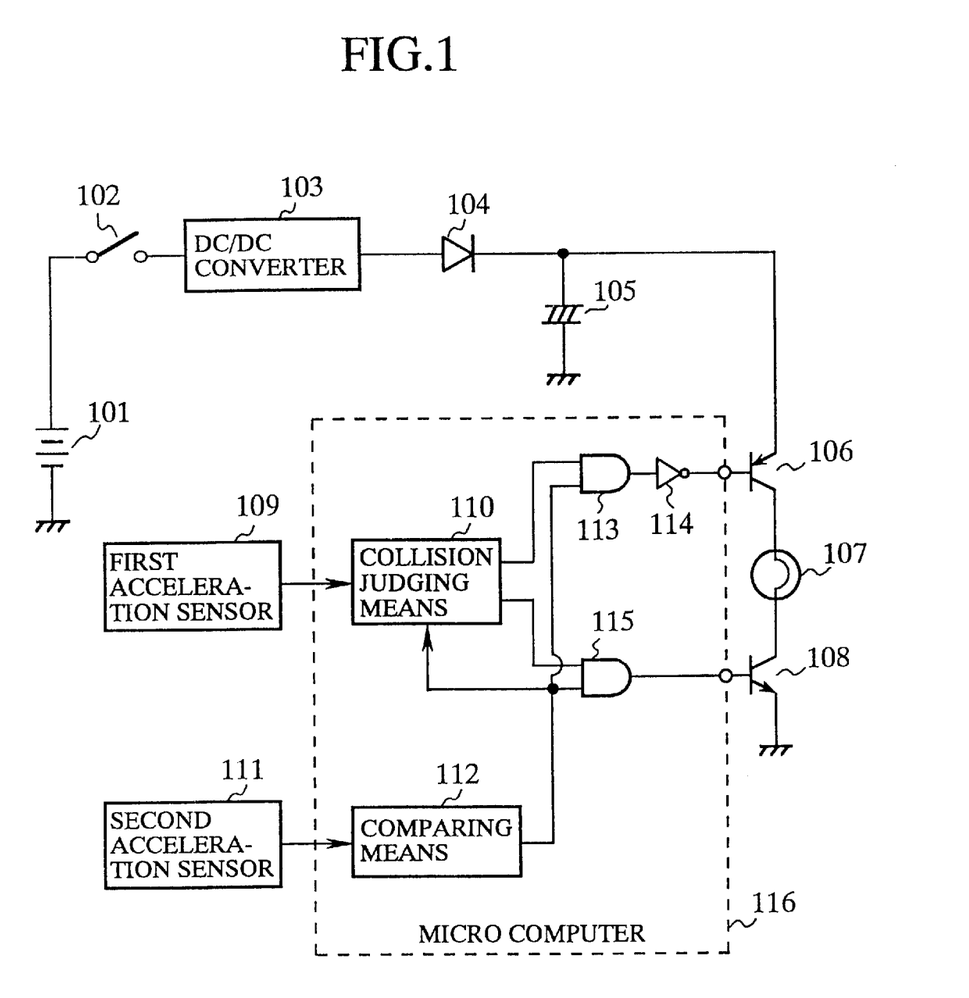
FIG. 1 shows a block diagram of electric circuit of a passenger protection apparatus according to the first aspect of the present invention.

The elements in FIG. 1, which are identical or equivalent with elements in FIG. 8, are referred by the same reference numerals, and their explanation is omitted. Only the points different from the apparatus in the prior art in FIG. 8 are explained, here.

The first and second acceleration sensors 109, 111 are so arranged that the polarities of their output are opposite, namely one is positive and the other is negative. For example, they are arranged back to back and are so configured that their sensing directions are different to each other by 180 degrees. In this embodiment, the characteristics of these sensors 109, 111 are the same.

The micro computer 116 is comprised of the collision judging means 110, the comparing means 112, a first and second AND gate means 113, 115. Each is realized as a software program routine. The routines corresponding to the collision judging means 110, the comparing means 112, the first AND gate means 113 and the second AND gate means 115 are executed sequentially and repeatedly.

The collision judging means 110 starts its procedure to estimate the accident, on the basis of an output of the first acceleration sensor 109, when a trigger signal, which is an output of the comparing means 112, is supplied.

The collision judging means 110 supplies the signal, which represents the estimation of the accident, to one input terminal of each first and second AND gate means 113, 115. The comparing means 112, which compares the output of the second acceleration sensor 112 and a predetermined standard value, supplies a switch signal to the other input terminal of each first and second AND gate means 113, 115.

The output terminal of the first AND gate means 113 is connected with the base terminal of the first switching transistor 106, which is the signal input terminal of the transistor, through an inverter. The output terminal of the second AND gate means 115 is connected with the base terminal of the second switching transistor 108. The output terminals of the second AND gate means and the inverter are realized by the output ports of the micro computer 116, here.

Using this circuit, the influence of external noise is reduced as explained below.

When an accident takes place, the first acceleration sensor 109 outputs a signal, for example as shown by a solid line in FIG. 2(A). And the second acceleration sensor 111 outputs a signal, for example as shown by a solid line in FIG. 2(B), their polarities are opposite to each other. When a common noise (E) is superimposed on these signal, due to the back to back configuration of the acceleration sensors. The output of the first acceleration sensor 109 becomes as shown by the broken line (H) in FIG. 2(A). And the output of the first acceleration sensor 109 becomes as shown by the broken lines (F) in FIG. 2(B).

Figure 2:
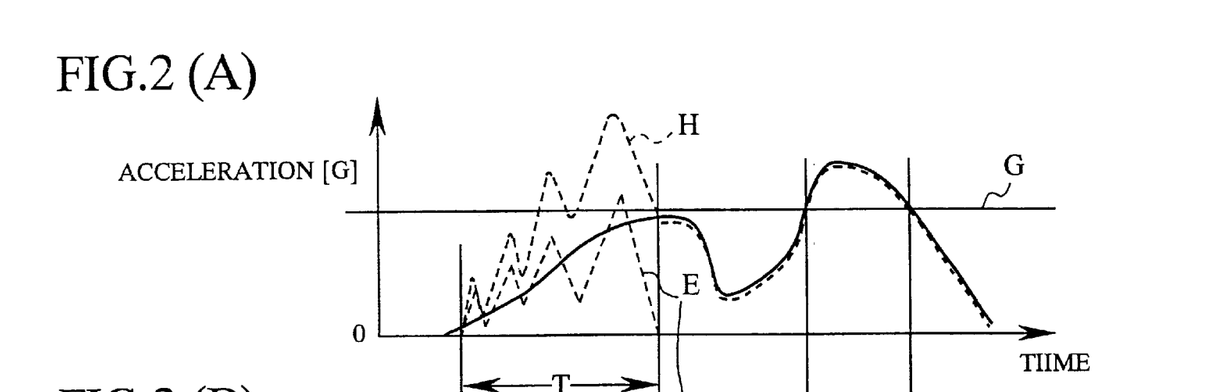
FIGS. 2A–B show an example of a set of signals for explaining the functioning of the apparatus in FIG. 1.

In section T in FIG. 2, where noises are superimposed, the value of the acceleration signal to be supplied to the collision judging means 110 is increased in the direction to exceed a threshold value G as shown in FIG. 2(A), on the contrary, the value of the acceleration signal to be supplied to the comparing means 112 is decreased in the direction to the zero level, namely the opposite direction to exceed the threshold value G. In other words, when common noises are added, the output of one of the first and second acceleration sensors 109, 111 increases in the direction to exceed a threshold value G, the other decreases in the opposite direction to exceed the threshold value G, namely the direction not to actuate the squib 107. Thus the protection false signals created by noise is improved.

It shall be remarked that the first and second AND gate 113, 115 receive independently outputs from the collision judging means 110 as well as from the comparing means 112, additionally, their outputs are independently supplied to the corresponding first and second switch circuit 106, 108 as shown in FIG. 1. Namely, the first and second AND gate means receive signals from the collision judging means 110 and the comparing means 112 independently from each other, and execute their logic independently using independent program routines from each other, and they output their result from different output ports.

The signals to be supplied from the collision judging means 110 and the comparing means 112 to the first and second AND gate means 113,115 are, in principle, the same. However, in this aspect of the invention, the signals for the first and second AND gate 113, 115 are independently calculated and are independently outputted through different output ports. As a result, even if the micro computer 116 is malfunctioning, the possibility that the values in both of the output ports will simultaneously reach a high level is small. Consequently, the possibility of erroneous functioning of the squib decreases.

Preferably, the first and second acceleration sensors are the same. However, acceleration sensors of different characteristics may be used, according specific cases. For example, when this aspect of the invention is applied to a passenger protection apparatus against the front collision of vehicle, one can select an acceleration sensor of nominal range of 50 G as a first acceleration sensor 109 for detecting a large acceleration, and can select an acceleration sensor of nominal range of 30 G as a second acceleration sensor for detecting a small acceleration.

This aspect of the invention has following advantages. The reliability of the control of the squib can be improved, because the squib is controlled according to results obtained independently in the micro computer. Because the first and second switch circuit can be controlled by the independent output ports of the micro computer, the possibility that the output ports become simultaneously a high level due to noises etc decreases. When the acceleration sensors have an identical characteristics, and they are arranged so that their output polarity are opposite to each other, the possibility of erroneous estimations of accident decreases.

Second Aspect of the Invention

Figure 3:
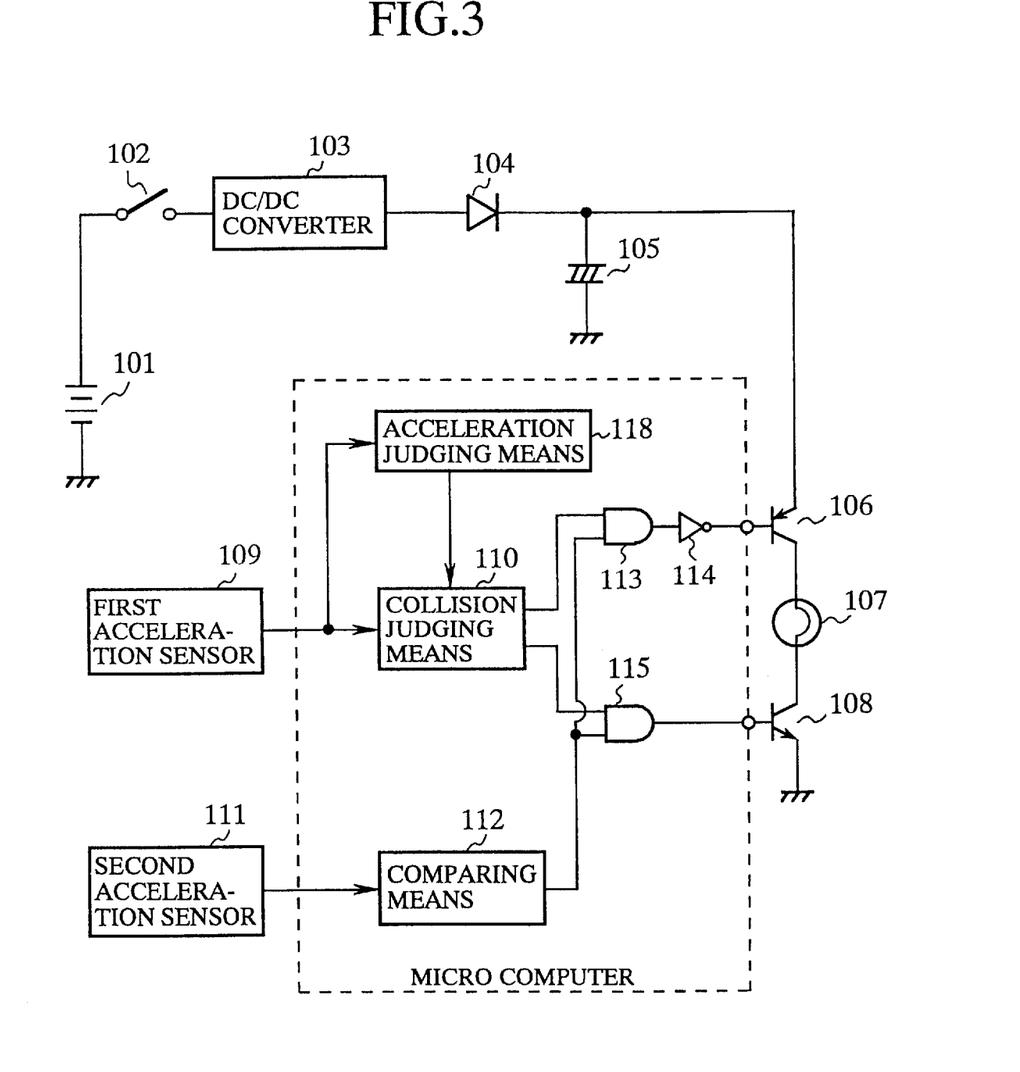
FIG. 3 shows a block diagram of electric circuit of a passenger protection apparatus according to the second aspect of the present invention.

In this aspect of the invention, the apparatus has an acceleration level judging means 118, which receives the output of the first acceleration sensor 109, as shown in FIG. 3. The acceleration level judging means 118 judges as to whether somewhat a collision happened, on the basis whether the output of the first acceleration sensor 109 exceeded a predetermined level or not. When it judges that a collision happened, it supplies a trigger signal to the collision judging means 110. The collision judging means, in turn, starts its collision judging algorithm program, when it receives the trigger signal.

Also, in this aspect of the invention, each of the blocks indicated by the reference numerals 110, 112, 113, 115, 116, 118 is realized by a software program routine, and they are executed one after another, and are repeated.

When the first and second acceleration sensors 109, 111 are installed on electric circuits in the apparatus, they shall be arranged adjacent to each other and the circuit shall have identical circuit patterns so that their noise circumstances are the same, and their output lines suffer a common noises.

Third Aspect of the Invention

Figure 4:
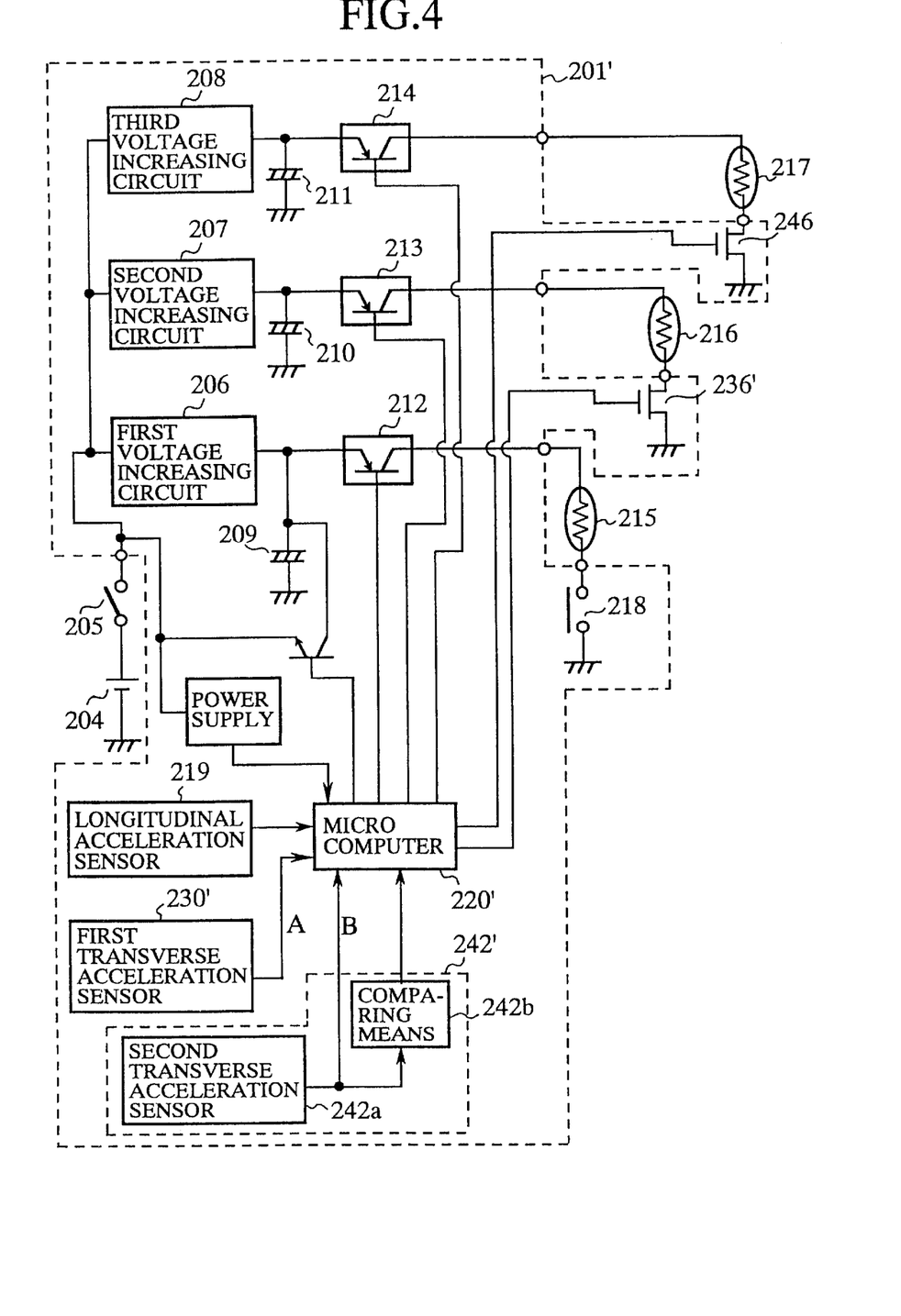
FIG. 4 shows a block diagram of a passenger protection apparatus according to the third aspect of the present invention.

The elements in FIG. 4, which are identical or equivalent with elements in FIG. 9, are referred by the same reference numerals, and their explanation is omitted. Only the points different from the apparatus in the prior art are explained, here.

The control unit for the front air bag 201' in FIG. 4 is a unit incorporating the functions of the first and second transverse acceleration sensors 230, 240, the first and second acceleration switches 232, 242', micro computers 231, 241 in FIG. 9 into the control unit for the front air bag 201.

The second transverse acceleration sensor 240 and the acceleration switch 242' in the control unit for the air bag at the seat next to the driver's seat 230 is incorporated in the control unit for front air bag as a unit. A second transverse acceleration sensor 242a and a comparing means 242b are connected with the micro computer 220'. A switching transistor 236' is connected in series with the squibs 216 and the second switching circuit 213. Another switching circuit 246 is connected in series with the squib 217 and the third switching circuit 214. The switching transistors 236', 246 are ON-OFF controlled by the micro computer 220' in synchronism with the switching circuits 213, 214 respectively.

In this aspect of the invention, communication between the micro computer 220 in the control unit for a front air bag 201 and the micro computers 231, 241 in the control units for side air bags 202,203 is not necessary. Only a supply of ignition current to the side air bags is needed.

The following functions are added into the micro computer 220' in the control unit for front air bag 201 compared with the prior art.

Figure 6:
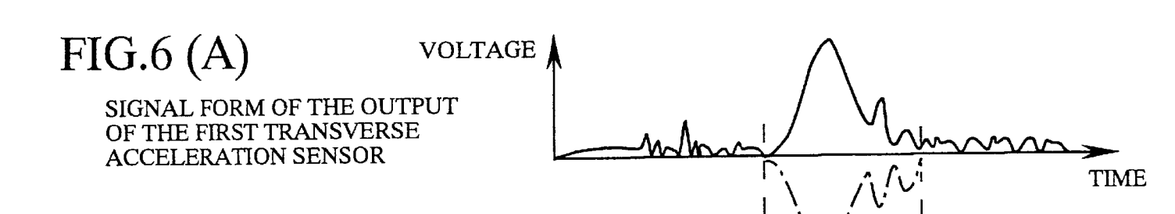
FIGS. 6A–C show an example of a set of signals for explaining the functioning of the apparatus in FIG. 5.

A first and second transverse acceleration sensors 230', 242a, which have the same characteristics, are arranged so that their sensing direction is different by 180 degrees, for example, back to back to each other, When an acceleration from a same direction is applied to the first and second transverse acceleration sensor 230' and 242a, the polarities of their outputs are opposite, namely one is positive and the other is negative, as shown in the collision section in FIG. 6. It will be understood by comparing each pair of solid lines and the broken lines.

When a front collision occurs, the first and second transverse acceleration sensors 230', 242a output signals, having signal shapes shown by the rigid lines in FIG. 6(A), (B). On the contrary, when a side collision occurs from the seat next to the driver's seat, the first and second transverse acceleration sensors 230', 242a output signals, having opposite polarities, as shown by dotted lines in FIG. 6.

As shown here, the acceleration signals provided into the micro computer 220' may have different polarities, depending upon the collision direction.

When the sensors have this configuration, electric noises appear in the signal lines as common noises, as shown in FIG. 6. They are shown in the noise sections in FIG. 6(A), (B). Namely the noise on both of the signal lines has the same wave shape. When the micro computer 220' calculates the subtraction between the output of the first transverse acceleration sensor 230' and the second transverse acceleration sensor 242a, their noise components disappear and the acceleration signal appears as a signal multiplied by two, as shown in FIG. 6(C).

Figure 5:
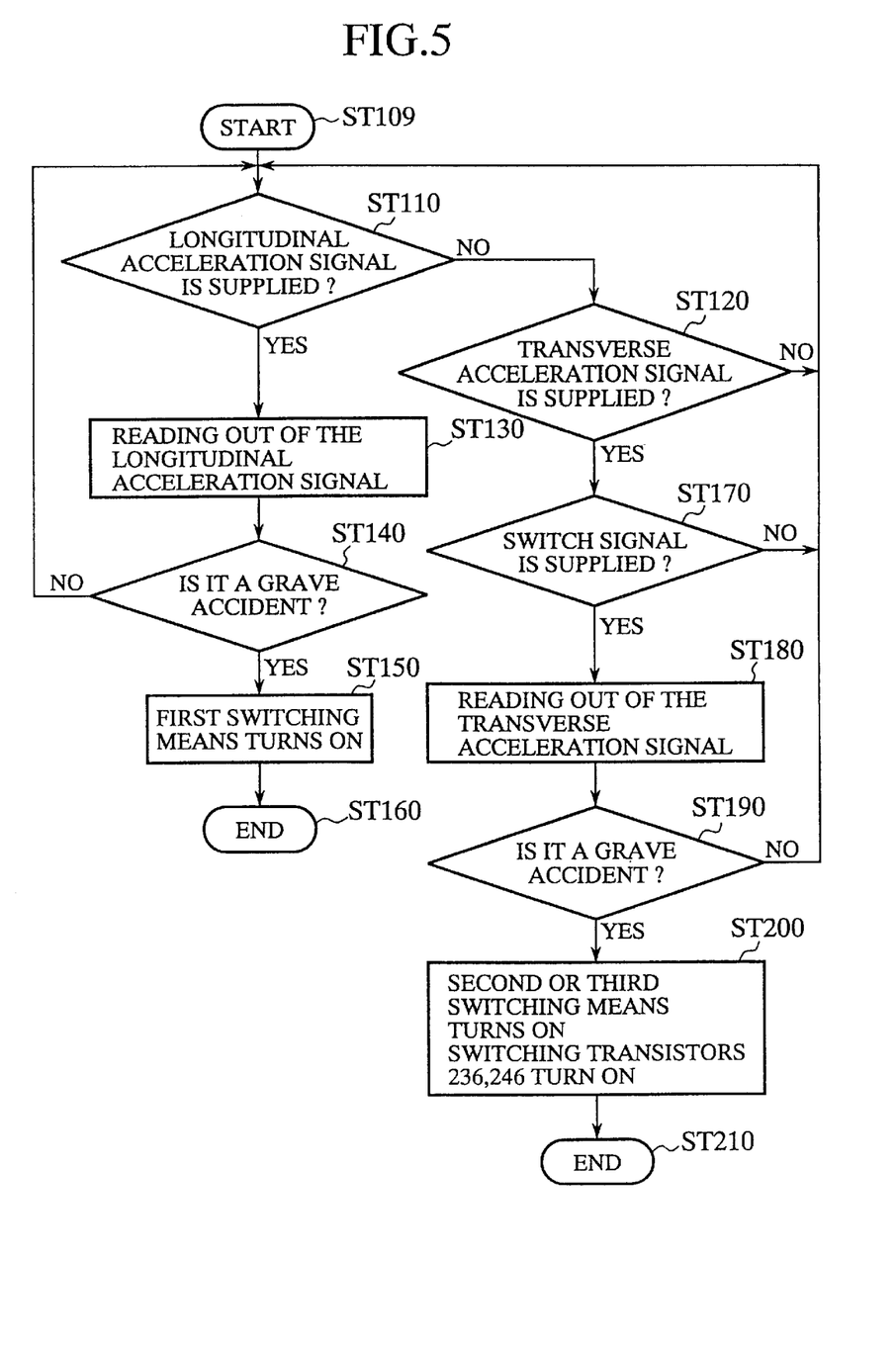
FIG. 5 shows a flow chart of the micro computer 20 in the apparatus of FIG. 4.

The procedure in the micro computer 220' is explained below, referring the flow chart in FIG. 5.

ST109: When the power supply is put on, the routine starts and ST110 follows.

ST110: It is determined whether a signal is provided from the longitudinal acceleration sensor 219. When it is determined that the acceleration signal is not provided, ST120 follows. When it is determined that it is provided, ST130 follows.

ST120: The subtraction between the outputs of the first and second transverse acceleration sensors 230', 242a is executed to obtain an acceleration signal with good S/N ratio. It is determined whether an acceleration signal is actually provided, on the basis of the obtained acceleration signal. When it is determined that such an acceleration signal is not provided, the routine returns to the step ST110. When the level of the obtained acceleration signal exceeds a predetermined standard value, the routine ST170 follows.

ST130: The signal of longitudinal acceleration is read out.

ST140: It is determined whether it is a grave collision or not. When it is determined that it is not a grave collision, the routin returns to the step ST110. When it is determined that it is a grave collision, ST150 follows.

ST150: The first switching circuit 212 is put to turn on, so that the squib 215 is actuated to inflate the front air bag, ST160 follows.

ST160: The procedure ends.

ST170: It is determined whether a switch signal is provided from the comparing means 242a. When it is determined that such a signal is not provided, the procedure returns to the step ST110. When it is determined that the signal is provided, ST180 follows.

ST180: The subtractions between the outputs of transverse acceleration signals, each of them is provided sequentially, are carried out to obtain a transverse acceleration signal with large S/N ratio. Then the routine proceeds to ST190.

ST190: It is determined whether the collision is grave or not, on the basis of the obtained transverse acceleration signal. Simultaneously it is determined whether the collision is a front collision or a side collision, on the basis of the shapes of the signals from the first and second transverse acceleration sensors 230', 242a, namely, according to their polarities. In other words, it is determined whether the set of the signals is better matched to the solid line set or the dotted line set, shown in FIGS. 6(A), (B). When it is determined that it is not a grave accident, the routine returns to the step ST110. When it is determined to be a grave accident, the routine proceeds to ST200 follows.

ST200: The second or third switching circuit is put to turn on, so as to actuate the squib 216 or 217. Then the side air bag at the driver's seat or at the seat next to the driver's seat inflates. Then the routine ST210 follows.

ST210: The routine ends.

Steps ST110, ST130, ST140, ST150 belong to a common flow chart. The steps ST120 to ST200 belong to a new one.

Fourth Aspect of the Invention

Figure 7:
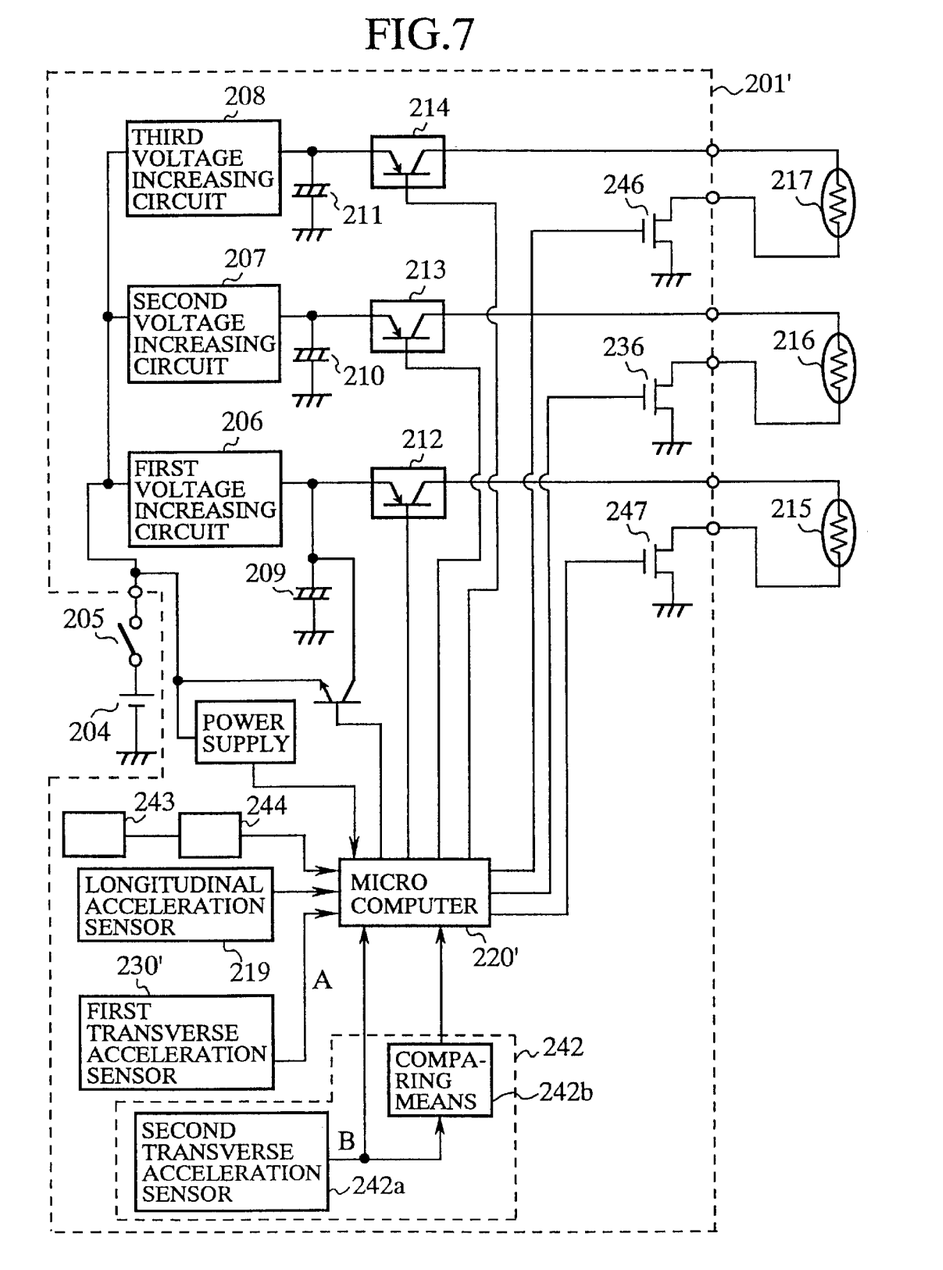
FIG. 7 shows a block diagram of a passenger protection apparatus according to the fourth aspect of the present invention.

This aspect is explained below, referring to FIG. 7.

In this aspect, the mechanical switch 218 in FIG. 9 is disappeared with, and in its place a second longitudinal acceleration sensor 219, switching transistors 236, 246, 247 are installed in the control unit for front air bag 201'. The second longitudinal acceleration sensor 243 has, preferably, the same characteristics as that of the first longitudinal acceleration sensor 219. The second longitudinal acceleration sensor 243 is arranged in a back to back configuration with the first acceleration sensor, in the same as the first and second transverse acceleration sensors 230' 242a.

The micro computer calculates the subtraction between the outputs of the first and second longitudinal acceleration sensor 219, 243 to obtain an acceleration signal with a high S/N ratio, as is calculated regarding to the first and second transverse acceleration signals. For this purpose, a comparing means 244 for making a switch signal, similar to the comparing means 242b in the third aspect, is arranged between the second longitudinal acceleration sensor 243 and the micro computer 220', and a procedure similar to the flow chart in FIG. 5 is carried out. The explanation of the procedure is omitted, to avoid redundancy.

In the explanation of the aforementioned aspect of the invention, the first and second longitudinal acceleration sensors 219, 243 have the same characteristics. However they can have different characteristics. For example, it is possible to select a wide range for the sensor 219 and a small range for the sensor 243. More specifically, a sensor of a nominal maximum acceleration of 50 G for the sensor 219, and a sensor of a nominal maximum acceleration of 30 G for the sensor 243 can be selected. In this case, the S/N ratio of the output of the sensor 243 is rather high. Thus, it is possible to predetermine a smaller acceleration for the standard in the comparing means 244.

As mentioned above, the third and fourth aspects of the invention allow the simplification of the structure of the passenger protection apparatus, which contains a plurality of air bags. Thus it is possible to decrease fabrication costs.

When all of the sensors have the same characteristics, the control of storing the necessary parts for the fabrication is easy, And it is possible to treat electric noise as being substantially identical, because substantially same noise appears in sensors of a similar kind.

On the other hand, when two kinds of sensors, a high cost sensor for a wide sensing range and a low cost sensor for a small sensing range, are used, the fabrication costs of a passenger protection apparatus can be decreased.

What is claimed is:

1. A passenger protection apparatus comprising:

a first acceleration sensor;

a second acceleration sensor, the polarity of the output of the second acceleration sensor being opposite to that of the first acceleration sensor;

comparing means for comparing the output of the second acceleration sensor with a predetermined standard value, and generating a switch signal when the output exceeds the standard value;

collision judging means for estimating whether the collision is grave or not, on the basis of the output of the first acceleration sensor;

first AND gate means for receiving the output of the comparing means calculated for the first AND gate means, and the output of the collision judging means calculated for the first AND gate means;

second AND gate means for receiving, independently from the first AND gate means, the output of the comparing means calculated for the second AND gate means, and the output of the collision judging means calculated for the second AND gate means;

a squib; and a first switching circuit, which is connected with the squib in series and is controlled so as to turn on, according to the outputs of the first AND gate means;

a second switching circuit, which is connected with the squib in series and is controlled so as to turn on, according to the outputs of the second AND gate means.

2. A passenger protection apparatus according to claim 1, further comprising:

a micro computer;

wherein said collision Judging means, said comparing means, and said first and second AND gate means are included in said microcomputer; and the outputs of the collision judging means appear at different output ports of the micro computer.

3. A passenger protection apparatus according to claim 1, wherein the first and second acceleration sensors have the same characteristics.

4. A passenger protection apparatus according to claim 1, wherein the first acceleration sensor detects the acceleration in a higher range, and the second acceleration sensor detects the acceleration in a lower range.

5. A passenger protection apparatus according to claim 1, wherein:

the comparing means, the collision judging means, and the first and second AND gate means are realized as a software computer program routine.

6. A passenger protection apparatus comprising:

a squib for inflating an air bag or for tightening a seat belt;

a first acceleration sensor;

a second acceleration sensor;

the polarity of the output of the second acceleration sensor being opposite to that of the first acceleration sensor;

comparing means for comparing the output of the second acceleration sensor with a predetermined standard value, and generating a switch signal, when the output exceeds the standard value;

collision judging means for judging whether the collision is grave or not, on the basis of the output of the first acceleration sensor, and generating an ignition signal, according to the estimation;

means for controlling the squib, which generates a signal to inflate the air bag, on the basis of the ignition signal from the collision judging means and the switch signal from the comparing means;

wherein the collision judging means calculates the difference between the outputs of the first and second acceleration sensors, and estimates the severity of the collision, on the basis of the calculated difference.

7. A passenger protection apparatus according to claim 6, further comprising:

a third acceleration sensor;

a fourth acceleration sensor;

wherein the first acceleration sensor and the second acceleration sensor form a first set of acceleration sensors; and the third acceleration sensor and the fourth acceleration sensor form a second set of acceleration sensors;

wherein the first set of acceleration sensors is orientated along the longitudinal direction of the vehicle; and the second set of acceleration sensors is orientated along the transverse direction of the vehicle.

8. A passenger protection apparatus according to claim 7, wherein the first set of acceleration sensors and the second set of acceleration sensors have the same characteristics.

9. A passenger protection apparatus according to claim 8, wherein the collision judging means estimates whether the collision is a front collision or a side collision, on the basis of the polarities of the outputs of the first and second acceleration sensors.

10. A passenger protection apparatus according to claim 7, wherein the collision judging means estimates whether the collision is a front collision or a side collision, on the basis of the polarities of the outputs of the first and second sets of acceleration sensors.

11. A passenger protection apparatus according to claim 6, wherein the collision judging means estimates whether the collision is grave or not, on the basis of the outputs of the first and second acceleration sensors, and generates an ignition signal to actuate the squib, on the basis of the estimation.

12. A passenger protection apparatus according to claim 6, wherein the first acceleration sensor detects large accelerations and the second acceleration sensor detects small accelerations with higher sensitivity.

13. A passenger protection apparatus according to claim 12, wherein the first and second acceleration sensors detect longitudinal acceleration.

14. A passenger protecting apparatus for a passenger vehicle comprising:

an air bag or a seat belt;

a squib for inflating the air bag or for tightening the seat belt;

a capacitor for storing electric charge;

first and second switching circuits for the squib;

first and second acceleration sensors, which are arranged adjacent to each other with the polarities of their outputs being opposite to each other; and a micro computer, which controls the first and second switching circuits, on the basis of the outputs of the first and second acceleration sensors;

wherein the micro computer comprises:

comparing means for comparing the output of the second acceleration sensor with a predetermined standard value, and generating a switch signal when the output exceeds the standard value;

collision judging means for comparing the output of the first acceleration sensor with another predetermined standard value for estimating the collision, when it receives the switch signal from the comparing means; and wherein the micro computer generates an ignition signal to actuate the first and second switching circuits to actuate the squib, by providing the electric charge from the capacitor.

15. A passenger protection apparatus according to claim 14, wherein:

the switching circuit comprises a first switching circuit and a second switching circuit; and the micro computer comprises:

a first output port;

a second output port;

first AND gate means for receiving the outputs of the collision judging means and the comparing means;

the first AND gate means providing its output to the first switching circuit via the first output port of the micro computer;

second AND gate means for receiving the outputs of the collision judging means and the comparing means;

wherein:

the outputs provided to the second AND gate means are calculated independently from the outputs provided to the first AND gate means; and the second AND gate means providing its output to the second switching circuit via the second output port of the micro computer.

16. A passenger protection apparatus according to claim 15, wherein:

the first AND gate means is realized in the form of a software computer routine; and the second AND gate means is realized in the form of a software computer routine.

17. A passenger protection apparatus according to claim 14, wherein the micro computer comprises:

acceleration level judging means for judging the level of acceleration, which receives the output of the first acceleration sensor, and provides a trigger signal to the collision judging means to start a collision estimating algorithm in the collision judging means, when the output of the first acceleration sensor exceeds a predetermined value.

18. A passenger protection apparatus according to claim 17, wherein:

the acceleration judging means is realized in the form of a software program routine.

19. A passenger protecting apparatus according to claim 14, wherein the apparatus comprises:

an air bag for front collisions;

an air bag for side collisions;

a front air bag squib for the front air bag;

a side air bag squib for the side air bag;

a front air bag capacitor for the front air bag squib;

a side air bag capacitor for the side air bag squib;

a front air bag switching circuit for the front air bag squib;

a side air bag switching circuit for the side air bag squib;

first and second transverse acceleration sensors, for detecting transverse acceleration;

a longitudinal acceleration sensor, for detecting longitudinal acceleration;

wherein the micro computer controls the switching circuits for each squib, on the basis of the outputs of the first and second transverse acceleration sensors and the longitudinal acceleration sensor.

20. A passenger protection apparatus according to claim 14, wherein:

the first and second acceleration sensors comprise first and second transverse acceleration sensors;

the first and second transverse acceleration sensors are arranged adjacently to each other in a back to back configuration;

the first and second transverse acceleration sensors output signals of opposite polarities;

the micro computer calculates the difference between the outputs of the first and second transverse acceleration sensors; and the collision judging means estimates the severity of the collision on the basis of the difference.

21. A passenger protection apparatus according to claim 14, wherein:

the first and second acceleration sensors comprise first and second transverse acceleration sensors;

the micro computer calculates the difference of the outputs of the first and second transverse acceleration sensors; and the collision judging means estimates the severity of the collision on the basis of the difference.

22. A passenger protection apparatus according to claim 21, wherein:

the micro computer estimates whether the collision is a collision from right side or from left side, on the basis of the polarities of the outputs of the first and second transverse acceleration sensors.

23. A passenger protection apparatus according to claim 14, wherein:

the first and second acceleration sensors are first and second longitudinal acceleration sensors; and the micro computer calculates the difference between the outputs of the first and second longitudinal acceleration sensors; and the collision judging means estimates the severity of the collision on the basis of the difference.

24. A passenger protection apparatus according to claim 14, wherein:

the comparing means is realized in the form of a software program routine; and the collision judging means is realized in the form of a software program routine.

* * * * *